(12) United States Patent
Thirappa et al.

(10) Patent No.: US 11,625,568 B2
(45) Date of Patent: Apr. 11, 2023

(54) FLEXIBLE MOUNTABLE L-SHAPED RFID TAG ANTENNA

(71) Applicant: Smartrac Investment B.V., Oegstgeest (NL)

(72) Inventors: Kunalen Thirappa, Kedah (MY); Fwee Leong Bong, Kedah (MY); Roslan Abdul Rahman, Kedah (MY)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/052,619

(22) PCT Filed: May 3, 2019

(86) PCT No.: PCT/EP2019/061366
§ 371 (c)(1),
(2) Date: Nov. 3, 2020

(87) PCT Pub. No.: WO2019/211432
PCT Pub. Date: Nov. 7, 2019

(65) Prior Publication Data
US 2021/0241063 A1 Aug. 5, 2021

(30) Foreign Application Priority Data
May 3, 2018 (EP) ...................... 18170684

(51) Int. Cl.
*G06K 19/077* (2006.01)
(52) U.S. Cl.
CPC .............. *G06K 19/07773* (2013.01)
(58) Field of Classification Search
CPC .............................................. G06K 19/07773
See application file for complete search history.

(56) References Cited

U.S. PATENT DOCUMENTS 8,169,322 B1 * 5/2012 Zhan ................ G06K 19/07749
340/572.7
2008/0036673 A1 2/2008 Yamagajo et al.
(Continued)

FOREIGN PATENT DOCUMENTS

CN 106981722 7/2017
CN 206470813 U 9/2017
(Continued)

OTHER PUBLICATIONS

International Search Report and Written Opinion dated Jul. 23, 2019 issued in corresponding IA No. PCT/EP2019/061366 filed May 3, 2019.
(Continued)

*Primary Examiner* — Matthew Mikels

(57) ABSTRACT

The invention discloses a flexible mountable RFID tag antenna. The object of the invention to present an RFID tag antenna which has a flexible and flat design, which is mountable on conductive surfaces without disadvantages in reading the data of the RFID chip and does not increase cost and complexity in the RFID tag manufacturing process and which can be mounted on any curvature structure will be solved by a flexible mountable RFID tag antenna comprising an RFID chip for storing data and an antenna structure operatively connected to the RFID chip for operating across RFID frequency band, wherein the RFID tag antenna is mounted on a dielectric layer and the RFID tag antenna laterally overlaps the dielectric layer at one edge of the dielectric layer forming an overlapping part, whereas the overlapping part of the RFID tag antenna forming an extended L-shaped antenna structure in its cross-sectional view and whereas the RFID tag antenna is suitable to be attachable to a conductive layer.

8 Claims, 3 Drawing Sheets

(56) References Cited

U.S. PATENT DOCUMENTS

2008/0068175 A1    3/2008  Hockey et al.
2012/0018505 A1    1/2012  Jiang et al.
2016/0205228 A1    7/2016  Orihara et al.

FOREIGN PATENT DOCUMENTS

| EP | 2019366    | 1/2009 |
| EP | 1887653    | 8/2015 |
| TW | I566470    | 1/2017 |
| WO | 2006/078147 | 7/2006 |

OTHER PUBLICATIONS

International Preliminary Report on Patentability dated Nov. 3, 2020 issued in corresponding IA No. PCT/EP2019/061366 filed May 3, 2019.

* cited by examiner

Inlay folded symmetrically and wrapped around a dielectric substrate

Inlay folded symmetrically, but ground layer is purposely unwrapped (a)

(b)

FLEXIBLE MOUNTABLE L-SHAPED RFID TAG ANTENNA

CROSS-REFERENCE TO RELATED APPLICATION

The present application is a 371 of International Application No. PCT/EP2019/061366 which was published in English on Nov. 7, 2019, and claims the benefit of EP Patent Application No. 18170684.7 filed on May 3, 2018, both of which are incorporated herein by reference in their entireties.

The invention relates to a flexible mountable L-shaped RFID tag antenna which is suitable for attachment to an electrically conductive surface.

A typical RFID system includes an RFID reader or interrogator, an RFID chip and an RFID tag antenna. The RFID chip and the antenna are typically packaged together to form an RFID tag. The RFID chip stores data which often includes identifying information. The data may be retrieved by an RFID reader through the RFID tag antenna.

A low cost passive RFID tag does not include any internal power supply. In such a system, the RFID reader sends both information and power to the RFID tag. The RFID tag receives the power and demodulates the data from the reader. The data stored in the RFID chip varies the impedance of the RFID tag antenna so the backscattering wave can be modulated. Then the reader retrieves the data sent by the RFID tag by demodulation. An RFID reader with an antenna communicates data and power to an RFID tag comprising the RFID chip. Data is then communicated from the RFID chip to the RFID reader.

85% of the commercial RFID tags are dipole-type antennas as it can harvest maximum e-field from the RFID reader. However, its performance will degrade sharply when brought close to a metal, hence conductive surface.

It is commonly known that an RFID tag cannot be read when a commonly used dipole antenna is placed on a conductive surface. The reason why the dipole type RFID tag cannot be read results from the fact that the image current created below the conductive surface has an opposite direction comparing to the original current path. The effect is that the total effective current is equal to zero.

Figure 1:
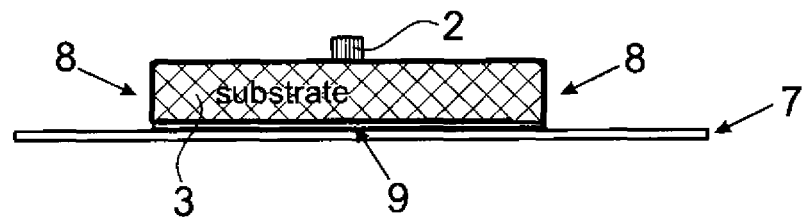

In most cases, RFID tags are therefore produced in folded structures, either as a single layer or as a double layer in order to avoid the canceling effect. The benefit of side folding is an easier manufacturing and lower cost as cheaper foam substrate can be used. But these designs add complexity in the manufacturing line and the RFID tag cost is very expensive. FIG. 1 shows a double folding structure of the prior art. An inlay is folded and wrapped around a cheap dielectric substrate 3. During the operation, the surface current will flow from the radiator (top layer) to the external metal surface via shorting edges. The tag is an ultra-high frequency device, the shorting edges actually introduce high inductive reactance component and making the tag highly inductive, which is needed to conjugate match the capacitive microchip. Also, the existence of extra high inductive reactance has made tag miniaturization possible. Designers can actually modify the width of the shorting edges to fine-tune the resonant frequency of the tag.

The prior art also provides various antennas which are mountable on metal and which use planar inverted-F antenna (PIFA) structures. So called PIFAs comprise vias that are used to short the radiator and the ground. This has the advantage that the RFID tag size could be miniaturized, also with a good ratio of performance to tag size; however, the tuning procedure of PIFA is tedious as the surface current on the patch is very sensitive to the locations of the vias. Even where such antennas demonstrate reasonable reading ranges, such antennas require relatively expensive substrate material (such as Teflon), complicated fabrication processes, thick substrates (3 mm to 4 mm) and result in RFID tag antennas which occupy relatively large areas.

Using high dielectric constant material to reduce total antenna size and the distance between the antenna and a conducting surface is also presented in prior art but the costs are expensive and the reading range is relatively low due to high dielectric material.

Using micro strip antennas is another option, but this would require an antenna length of half wavelength, which does not suit in some applications where space is the limitation factor. A micro strip antenna comprises of a dielectric substrate which is inserted between the radiator and ground.

Usually a printed circuit board (PCB) is used for the RFID tag fabrication which is rigid and not suitable for surface with different curvatures. Furthermore, a three layer design concept would also increase the manufacturing complexity of the RFID tag.

Thus, various attempts have been made to provide metal surface mountable RFID tag antennas. However, such attempts have resulted in designs which are too large, too expensive to fabricate, too limited with respect to reading range, or in designs that otherwise adversely affect the performance of the RFID tag or its commercial viability. What is needed is an improved metal surface mountable RFID tag antenna.

It is therefore an objective of the invention to present an RFID tag antenna which has a flexible and flat design, which is mountable on conductive surfaces without disadvantages in reading the data of the RFID chip and does not increase cost and complexity in the RFID tag manufacturing process and which can be mounted on any curvature structure.

The objective of the invention will be solved by a flexible mountable RFID tag antenna comprising an RFID chip for storing data and an antenna structure operatively connected to the RFID chip for operating across RFID frequency band, wherein the RFID tag antenna is mounted on a dielectric layer and the RFID tag antenna laterally overlaps the dielectric layer at one edge of the dielectric layer forming an overlapping part, whereas the overlapping part of the RFID tag antenna forming an extended L-shaped antenna structure in its cross-sectional view and whereas the RFID tag antenna is suitable to be attachable to a conductive layer.

Considering the ground layer underneath the substrate in FIG. 1, it becomes clear that the ground layer 9 in FIG. 1 actually does not bring much benefit to the overall RFID tag performance. Because once the ground layer 9 is attached to the metal surface, it will only be considered as part of the external metal surface. So, since the ground layer 9 brings no benefit to the overall RFID tag performance, it can be removed. This will help to reduce the manufacturing complexity. The functionality of the folded RFID tag in FIG. 1 and the inventive design as claimed will be the same.

The inventive design of the flexible mountable RFID tag antenna compared to prior art is its very simple structure, the low profile and its cost effective manufacturing. The term antenna structure in the sense of this invention will be used to describe the antenna geometrical configuration.

The inventive RFID tag antenna comprises a conductive structure forming the antenna on a dielectric substrate whereas the antenna is electrically connected to the RFID chip for storing data. The antenna is furthermore attached to the dielectric layer and can be attached to a conductive layer in the overlapping parts if the RFID tag antenna will be used on conducting surfaces. A conductive surface can be made of Cu, Al, Cu alloys, Fe, Fe alloys and similar metals or metal compositions. The surface to which the antenna can be attach can also be made of organic or inorganic conductive materials. But the inventive flexible mountable RFID tag antenna is also attachable to non-conductive surfaces. The antenna structure of the inventive flexible mountable RFID tag antenna overlaps the dielectric layer on one edge. In the side-view or cross-sectional view, the overlapping part forms an extended L-shaped structure. This is very advantageous, because the manufacturing process can be extremely simplified. Hence, this reduces the overall costs as well. The antenna's extended L-shaped grounds placed for example on conductive metal surface of the conductive layer and make the conductive metal surface to be part of the antenna. This gives the advantage for low profile antenna and better read distance. In addition, PCBs with via holes are no longer needed to connect to metal base since product cost is relatively lower than PCB material.

As the design does not limit the performance of the RFID tag or its commercial viability, the inventive RFID tag antenna results in a highly improved metal surface mountable RFID tag antenna.

In a second embodiment of the flexible mountable L-shaped RFID tag antenna, the RFID tag antenna laterally overlaps the dielectric layer at two edges. Hence, the antenna structure forms an extended L-shaped structure laterally on both sides of the dielectric layer. Having two extended L-shaped grounds connected on the conductive metal surface, gives the advantage of antenna miniaturization and directivity is orientated normal to radiating patch.

In a further preferred embodiment of the inventive flexible mountable L-shaped RFID tag antenna, the overlapping parts of the RFID tag antenna are connected to a conductive layer via mechanical fastener and/or chemical bonding. These are preferred techniques, because it effectively channel the antenna surface current to the external conductive layer.

In another embodiment of the inventive flexible mountable L-shaped RFID tag antenna, the RFID chip is directed upwardly away from the dielectric layer. In this embodiment it is necessary to add an additional face lamination over the RFID tag antenna for chip protection.

In another further embodiment of the inventive flexible mountable L-shaped RFID tag antenna, the RFID chip is faced to the dielectric layer. This has the positive effect that the RFID chip is directly protected from external damages. Thus, more robust RFID tag can be produced without the need of additional process for chip protection.

In a very preferred embodiment of the inventive flexible mountable L-shaped RFID tag antenna, the RFID tag antenna is of flexible material and suitable to be attached to a conductive layer of any curvature surface. This embodiment gives the flexibility that the inventive RFID tag antenna can be attached to any curvature conductive surface. The curvature surface can be convex or concave or of any other form.

In another embodiment, the conductive layer is made of an organic or inorganic conductive material. Or it is made of a metal or a metal composition. For example, it can be made of Cu, Al, Cu alloys, Fe, Fe alloys and similar metals or metal compositions. But the inventive flexible mountable L-shaped RFID tag antenna is also attachable to non-conductive surfaces.

The invention will be explained in more detail using exemplary embodiments.

The appended drawings show

Figure 2:
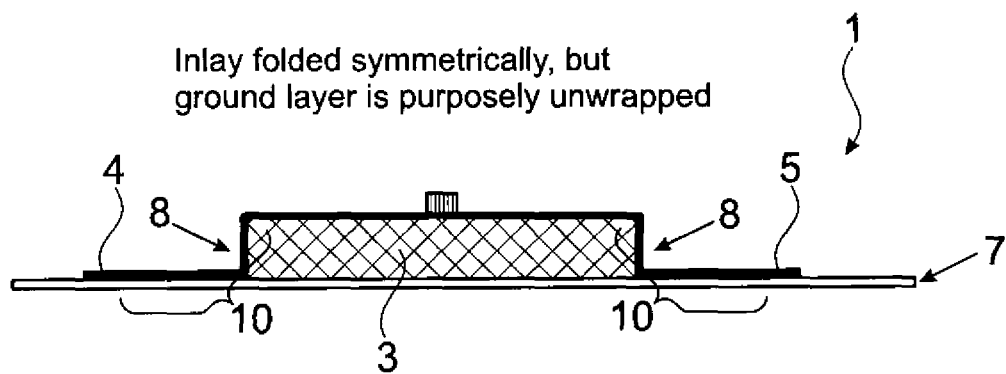
Figure 3:
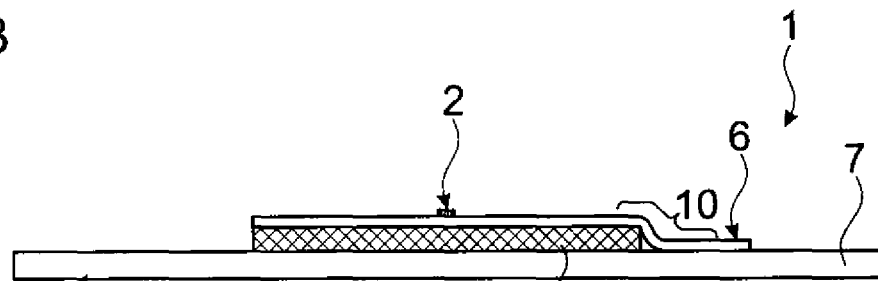
Figure 3:
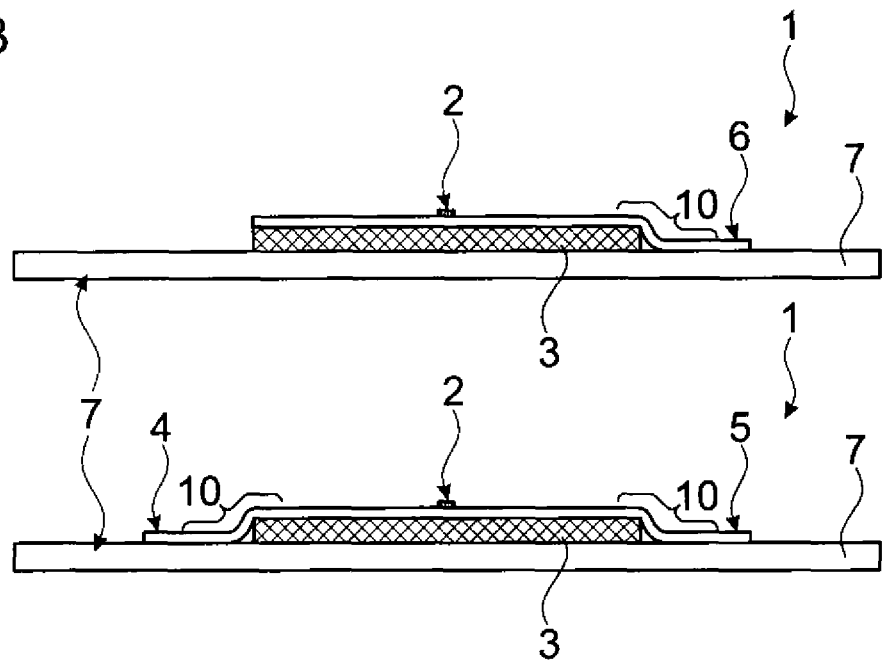
Figure 4:
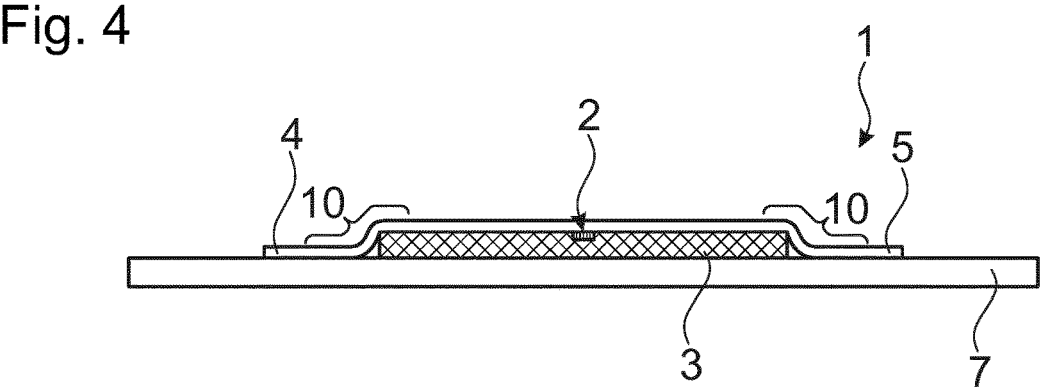
Figure 5:
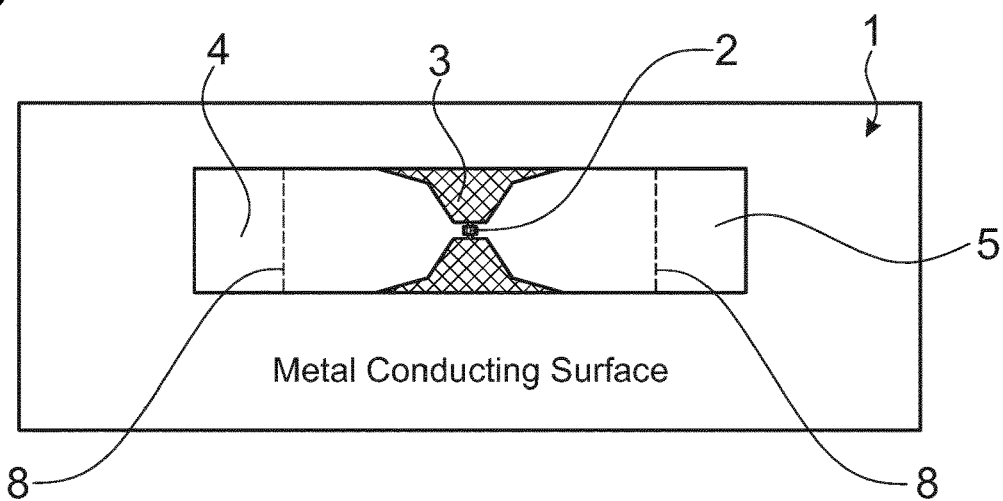
Figure 6:
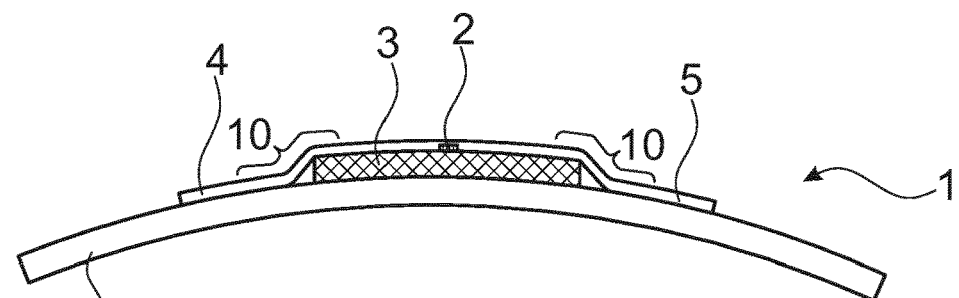
Figure 6:
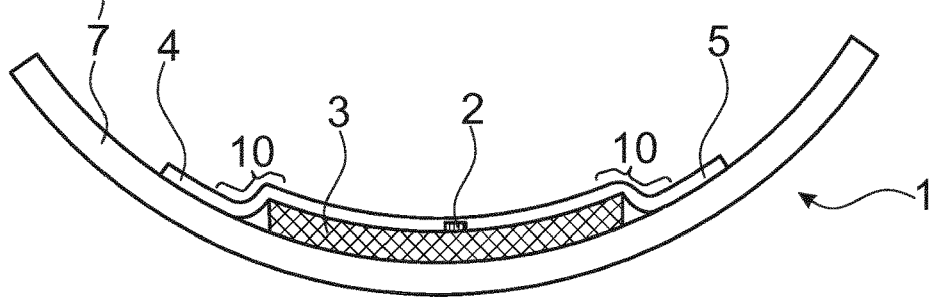
Figure 7:
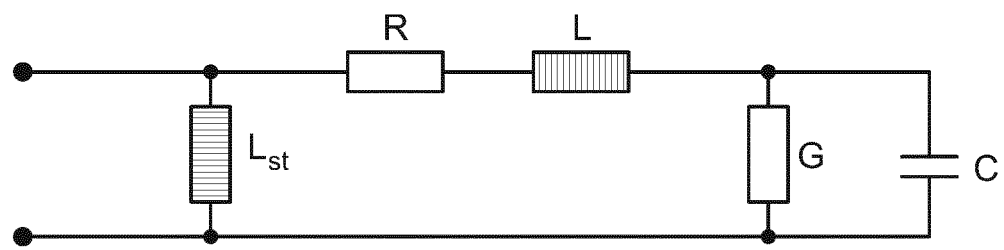

FIG. 1 Common double folded metal mountable RFID tag (according to the prior art);

FIG. 2 Inventive flexible mountable L-shaped RFID tag antenna;

FIG. 3 Inventive flexible mountable L-shaped RFID tag antenna with a) L-shaped overlapping part on one edge of the dielectric layer; b) L-shaped overlapping part on two sides of the dielectric layer;

FIG. 4 Inventive flexible mountable L-shaped RFID tag antenna with RFID chip faced to the dielectric layer;

FIG. 5 Inventive flexible mountable L-shaped RFID tag antenna in top-view;

FIG. 6 Inventive flexible mountable L-shaped RFID tag antenna flexibly attached to any curvature conductive surface; a) convex; b) concave;

FIG. 7 Equivalent circuit model for the proposed RFID tag antenna concept.

FIG. 2 shows the inventive flexible mountable L-shaped RFID tag antenna 1. The RFID tag antenna, comprising the RFID chip 2 and the antenna structure, is mounted on a dielectric layer 3, whereas the RFID tag antenna 1 overlaps said dielectric layer 3 forming an extended L-shaped antenna structure. The extended L-shaped ground of the antenna structure can be attached to a metal surface 7. This design extremely helps to reduce the manufacturing complexity, what is needed especially in industry processes to reduce costs. The functionality is not influenced by the design; it works as well as the folded structure shown in FIG. 1.

FIG. 3a shows a first embodiment of the inventive flexible mountable L-shaped RFID tag antenna 1. The extended L-shaped ground of the antenna 6 is attached to a conductive metal surface 7 via a mechanical fastener and/or a chemical bonding. FIG. 3a shows the side view of the structure when the RFID tag antenna 1 overlaps on only one side of the dielectric layer 3 and the overlapping part 6 is attached to the conductive metal surface 7. This is also called a single sided extended L-shaped ground 6. Single extended L-shaped 10 ground 6 gives advantage for wider bandwidth antenna design.

FIG. 3b shows a further embodiment of the inventive flexible mountable L-shaped RFID tag antenna 1. Two extended L-shaped 10 grounds 4, 5 overlapping two edges or sides of the dielectric layer 3 and are connected to the conductive metal surface 7. Having two extended L-shaped 10 grounds 4, 5 connected on the conductive metal surface, gives the advantage of antenna miniaturization and directivity is orientated normal to radiating patch.

As shown in FIG. 3 the RFID tag antenna 1 is attached to a conductive substrate material 7 in such a way that the RFID chip 2 is facing up. Thus, additional face lamination is needed for chip protection. Another way to attach the antenna 1 to substrate is by having the RFID chip 2 facing the dielectric layer 3 as shown in FIG. 4. With such a structure, the RFID chip 2 is protected from any external damages. Thus, a more robust tag can be produced without the need of additional process for chip protection.

The antenna extended L-shaped 10 grounds 4, 5, 6 are placed on a conductive metal surface 7 makes the conductive surface to be part of the antenna. This gives the advantage for low profile antenna and better read distance. In addition, a printed circuit board with via holes are no longer needed to connect to metal base. Hence, product costs are relatively lower than PCB material. A top view of the inventive flexible mountable L-shaped RFID tag antenna 1 is shown in FIG. 5.

FIG. 6 shows a further very preferred embodiment of the inventive flexible mountable L-shaped RFID tag antenna 1. The structure gives the flexibility to be attached to any curvature conductive surface 7. The conductive surface can have any curvature form, for example it can be formed as a convex or concave structure. The inventive flexible mountable L-shaped RFID tag antenna 1 can be easily attached to any form of the conductive layer 7.

FIG. 7 shows the equivalent circuit model for the proposed antenna concept. This circuit model provides information about the impedance characteristic of the proposed RFID tag antenna 1. The radiator patch and ground form capacitor-like plates and the corresponding capacitance can be calculated using C=εAT/t, where ε and t are the permittivity and thickness of the substrate 7. The interconnecting inductive L-shaped stubs are made up the inductance $L_{st}$.

LIST OF REFERENCE SIGNS

1 RFID tag antenna
2 RFID chip
3 dielectric layer
4 extended L-shaped ground of the antenna on a first side/edge of the dielectric layer
5 extended L-shaped ground of the antenna on a second side/edge of the dielectric layer
6 extended L-shaped ground of the antenna on only one side/edge of the dielectric layer
7 conductive layer
8 shorting edge
9 ground layer
10 extended L-shaped antenna structure
C=Parallel Capacitance of the top layer (without shorting stub)
G=Conductance of the top layer (without shorting stub)
L=Inductance of the top layer (without shorting stub)
R=Resistance of conductor of the top layer (without shorting stub)
$L_{st}$=Inductance introduced by two shorting stubs

The invention claimed is:

1. A flexible mountable RFID tag antenna comprising an RFID chip (2) for storing data and an antenna structure operatively connected to the RFID chip (2) for operating across RFID frequency band, wherein the RFID tag antenna (1) is mounted on a dielectric substrate (3) and the RFID tag antenna (1) laterally overlaps the dielectric layer (3) at one edge of the dielectric layer forming an overlapping part (4, 5, 6), whereas the overlapping part (4, 5, 6) of the RFID tag antenna forming an extended L-shaped antenna structure (10) in its cross-sectional view and whereas the RFID tag antenna (1) is suitable to be attachable to a conductive layer (7).

2. The flexible mountable RFID tag antenna according to claim 1, wherein the RFID tag antenna (1) laterally overlaps the dielectric substrate at two edges (5, 6) of the dielectric layer (3).

3. The flexible mountable RFID tag antenna according to claim 1, wherein the RFID chip (2) is directed upwardly away from the dielectric layer (3).

4. The flexible mountable RFID tag antenna according to claim 1, wherein the RFID chip (2) is faced to the dielectric layer (3).

5. The flexible mountable RFID tag antenna according to claim 1, wherein the overlapping parts of the RFID tag antenna (1) are connected to a conductive layer (7) via mechanical fastener and/or chemical bonding.

6. The flexible mountable RFID tag antenna according to claim 1, wherein the conductive layer (7) is made of an organic or inorganic conductive material.

7. The flexible mountable RFID tag antenna according to claim 1, wherein the conductive layer (7) is made of metal.

8. The flexible mountable RFID tag antenna according to claim 1, wherein the conductive layer (7) is made of a metal composition.

* * * * *